H. ARON.
ELECTRICITY METER.
APPLICATION FILED APR. 29, 1909.
979,635.
Patented Dec. 27, 1910.
2 SHEETS—SHEET 2.
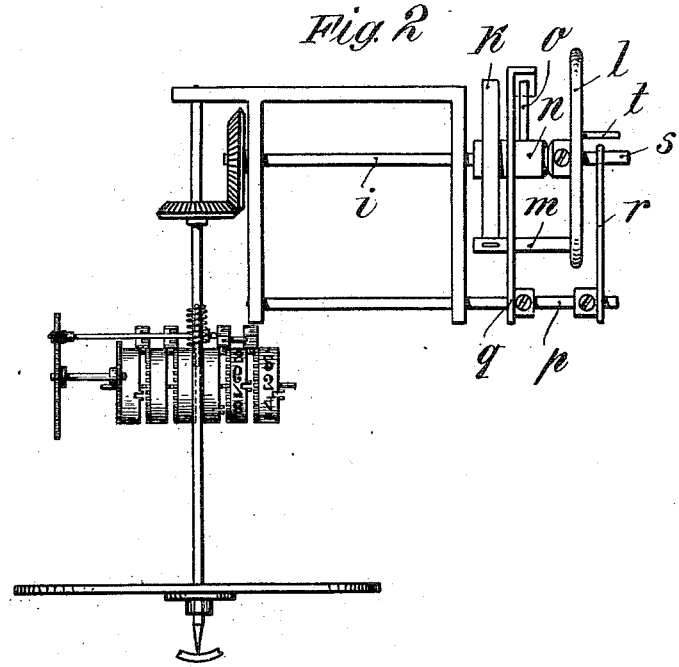
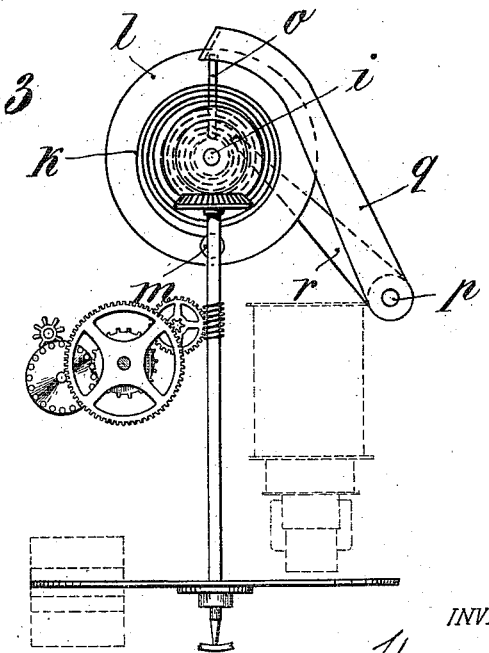

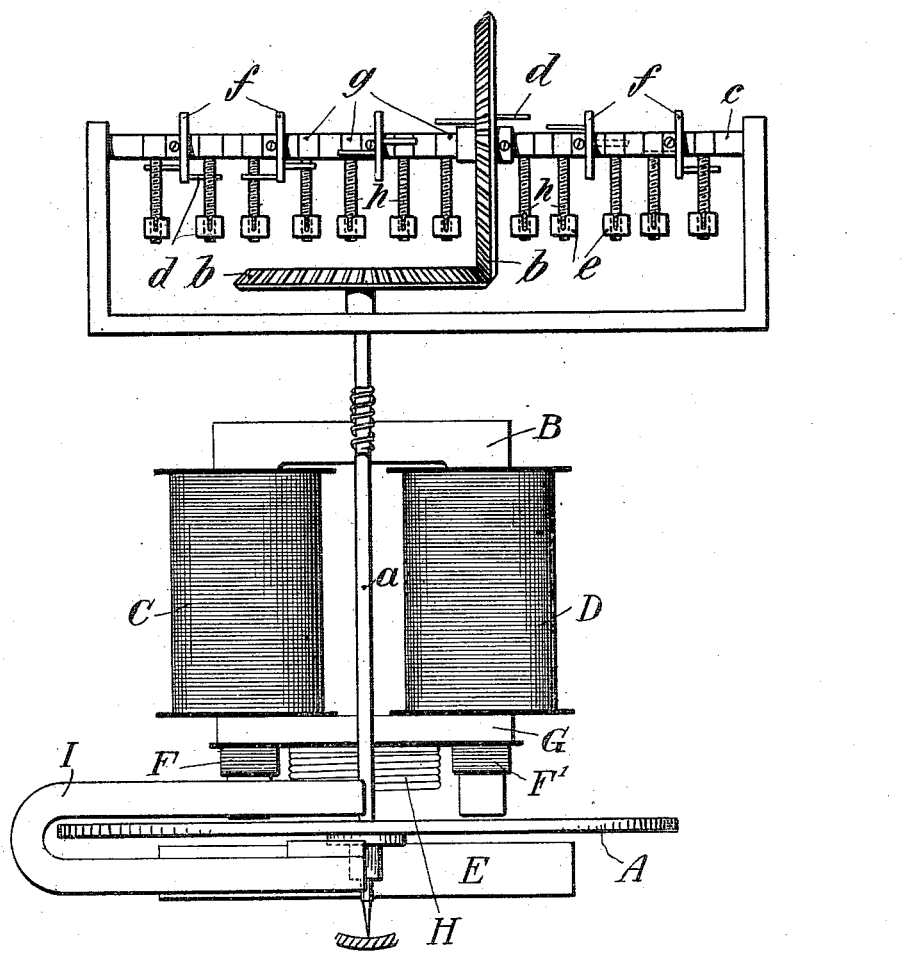

UNITED STATES PATENT OFFICE.

HERMANN ARON, OF CHARLOTTENBURG, GERMANY, ASSIGNOR TO THE AMERICAN ARON ELECTRICITY METER COMPANY, A CORPORATION OF NEW JERSEY.

ELECTRICITY-METER.

979,635.

Specification of Letters Patent.   Patented Dec. 27, 1910.

Application filed April 29, 1909.  Serial No. 493,015.

*To all whom it may concern:*

Be it known that I, HERMANN ARON, Ph. D., electrician, citizen of Germany, subject of the King of Prussia and Emperor of Germany, residing at Charlottenburg, near Berlin, in the Kingdom of Prussia and Empire of Germany, have invented new and useful Improvements in Electricity-Meters, of which the following is a specification.

This invention relates to electricity meters, which begin to register only when a certain load is exceeded, and which indicate only the amount of energy exceeding this load. This load, from which the meter begins to register is known as the "bulk limit." For such purpose a normal motor-driven meter is used whose rotating shaft is loaded with an additional constant turning moment opposed to the torsional moment driving the meter. The meter will only be set in motion forward, when its turning moment has become greater than the opposing constant moment, and will always indicate an amount, which is smaller according to the amount of the opposing moment.

The essential difference between meters in accordance with my invention and the hitherto known constructions is that, in a meter according to my invention, backward locking of the meter is avoided. This is done by causing the opposing turning moment not to operate constantly but only for short periods, on the meter drive in such a manner that, on stopping the meter drive, a backward turning, resulting from the back-driving force, or moment, lasts only a very short time and is practically without influence on the indicator of the meter. In order to keep the back-driving force, or moment, as uniform as possible, several loading organs are provided which are brought successively into operation at equal intervals of time. The connecting and disconnecting of these organs are brought about automatically by the turning of the meter. In order to balance the frictional resistance of the meter, the meter may be regulated somewhat for forward running light, or no load which must, of course, be so slight that the back-driving moment is considerably greater.

In the accompanying drawings, two arrangements according to my invention are shown.

Figure 1 shows an arrangement in which the organs of loading consist of weighted levers. Figs. 2 and 3 show two views, at right angles to each other, of an arrangement in which a spiral spring is used as the organ of loading.

In Fig. 1, $a$ is the meter shaft whose turning movement is transmitted by means of gear, or bevel, wheels $b$, $b$, to the shaft $c$, on which, at equal intervals from one another, are fixed disks $f$ provided with projecting pins $d$, parallel with the shaft $c$. Between adjacent disks, bushes $g$, are rotatably mounted on the shaft $c$, these bushes carrying screwed levers $h$, carrying weights $e$, whose distance from the axis of the shaft $c$ can be adjusted, when desired, by screwing them on the levers $h$. Each lever $h$, in the turning of the meter, is acted upon so as to raise its weight, (which was previously in a position of stable equilibrium), to a position of unstable equilibrium and, in moving from the one position to the other, perform work in the meter, while, in moving from the unstable to the stable position, no work is performed on the meter, the active energy being very quickly absorbed by the to and fro oscillations of the weights about their stable position. The pins $d$, are spaced equally around the circle, so that each weight is raised in succession and therefore a sufficiently uniform back-driving moment is obtained. When current is not being supplied to the meter, which will then be at rest, the turning moment ceases completely owing to the small extent of travel, which each raised weight has in its return to a position of stable equilibrium. When the meter load is below the bulk limit at which the meter begins to act, any weights, corresponding to the load, will be raised and the meter will move forward a fractional part of a revolution which however is practically negligible.

The means for imparting to the shaft or spindle $a$ its driving moment are or may be the actuating devices under the influence of the current to be measured which are shown in my United States Patent No. 820,333, dated May 8, 1906. In accordance with said patent, the rotary spindle $a$ carries a disk A of aluminum or other conducting material. Above this disk and at one side of the spindle is arranged a horseshoe electromagnet B which is energized by shunt coils C and D. Beneath the magnet B and below the disk A is arranged an armature E. The parallel limbs of the magnet B are provided with short-circuited copper windings F F' beneath the coils C and D, a bridge-piece G being arranged between the poles of the magnet B and carrying a small series coil H traversed by the main current. This arrangement produces in front of the poles of the electromagnet B two unsymmetrical magnetic fields having a phase difference of about ninety degrees relatively to each other and of such direction that they tend to rotate the disk A in the same drection, but the driving moment thus applied to the spindle $a$ is opposed by the resisting or retrograde moment produced by the weighted arms $h$ which overbalances the driving moment and prevents the rotation of the disk A until the normal limit of load imposed upon the circuit is exceeded, when the spindle $a$ begins to rotate and continues this action for operation of the counting mechanism until the load is reduced to normal magnitude.

As the weights $e$ apply to their carrying shaft $c$, and hence to the driving spindle $a$, not only a resistance to turning but a tendency to retrograde movement in opposition to the driving moment, it will be observed that any slight fluctuations in the load imposed upon the main circuit will be compensated for by the alternate forward and backward movements of the rotary parts without effecting a permanent advance of the spindle $a$. In other words, slight fluctuations in the current used within normal limits will not produce a "creeping" of the counting mechanism so as to show excess of current not actually used.

It will be further observed that the resistance offered to the forward movement of the shaft $a$ is substantially uniform regardless of the speed of rotation, and the mechanism thus differs in its mode of operation from apparatus of this nature in which an electromagnetic resistance device is employed to restrain the free rotation of the meter spindle. By the present improvement the meter spindle $a$ is connected by gearing to a secondary shaft which carries the rotation-resisting means, so that its sensitiveness is not impaired by its being weighted down with other parts of the mechanism, as in certain other constructions employing electromagnetically actuated resistance devices which are necessarily carried by the meter spindle.

In the arrangement shown in Figs. 2 and 3 the moment opposed to the driving moment of the meter is obtained by springs. In this arrangement only one spring is shown for simplicity, but, in practice, for the purpose of obtaining the greatest possible constant and efficient opposing force, a number of springs will be used, placed in succession. The shaft $i$, is, as in the hereinbefore described arrangement, driven from the meter shaft. On the shaft $i$ is arranged a spiral spring $k$, one end of which is fixed, relatively to the shaft, by the pin $m$, secured on the disk $l$, the inner end of the said spring being fixed to a bush $n$, loose on the shaft $i$. Secured to this bush is a pin $o$, which lies in the path of a projection from the stopping lever $q$, secured on a shaft $p$. Normally the pin $o$, bears against the projection from the lever $q$, so that, by the turning of the shaft $i$, the spring $k$, is wound up. After each rotation, that is after the spring has become wound up the stopping lever $q$, is raised so far that it frees the pin $o$, thereby freeing the spring. The uncoiling of the spring and turning of the bush $n$, with the pin $o$, continues till the pin $o$, again strikes against the projection from the lever $q$. The freeing of this lever is caused by the action of a lever $r$, secured to the shaft $p$. This lever is raised once during each rotation by a lift-pin $t$, eccentrically fixed to the disk $l$, so that it lifts the lever $q$, at regular intervals, while, at other times, the lever $r$, lies on the centrally arranged pin $s$.

Having now particularly described and ascertained the nature of my said invention and in what manner the same is to be performed I declare that what I claim is:—

1. In an electricity meter, a rotary spindle, means under the influence of the current to be measured for applying thereto a driving moment, means for applying to said spindle a retrograde moment in opposition to said driving moment, and coupling means for intermittingly connecting and disconnecting the retrograde moment applying means and said spindle.

2. In an electricity meter, a rotary spindle, means under the influence of the current to be measured for applying thereto a driving moment, means comprising a plurality of independently operable parts adapted to apply to said spindle a plurality of rotation-resisting moments, and coupling means for successively connecting and disconnecting said parts of the resisting moment applying means and said spindle.

3. In an electricity meter, a rotary spindle, means under the influence of the current to be measured for applying thereto a driving moment, means comprising a plurality of independently operable parts adapted to apply to said spindle a plurality of rotation-resisting moments and including adjusting means for varying the intensity of said resisting moments, and coupling means for successively connecting and disconnecting said parts of the resisting moment applying means and said spindle.

4. In an electricity meter, a rotary shaft, means under the influence of the current to be measured for applying thereto a driving moment, weights supported by said rotary shaft and freely movable relative thereto, and lifting means for said weights fixed to said shaft and adapted to release said weights when raised to a predetermined height.

5. In an electricity meter, a rotary shaft, means under the influence of the current to be measured for applying thereto a driving moment, weighted arms loosely mounted on said shaft, and lifting members fixed upon said shaft and adapted for engagement of the weighted arms upon one side only of the latter and for the release of the same as they are raised to a position of maximum height above said shaft.

6. In an electricity meter, a rotary shaft, means under the influence of the current to be measured for applying thereto a driving moment, means comprising a plurality of independently operable parts to apply to said shaft a turning moment in opposition to said driving moment, and means whereby said independently operable parts are successively coupled to said shaft and are released therefrom in the same order as they reach a given position relative to said shaft.

7. In an electricity meter, a rotary shaft, means under the influence of the current to be measured for applying thereto a driving moment, a plurality of swinging arms loosely suspended from said shaft and having threaded outer ends, a plurality of lifting members fixed upon said shaft in alternate relation with said swinging arms, lateral pins each carried by one of said members and adapted to engage one side of its respective swinging arm, said pins being arranged in uniform circular spacing apart around said shaft, and a weight applied to the threaded end of each of said swinging arms and adapted to be adjusted toward and from said shaft.

In testimony whereof I have hereunto set my hand in presence of two subscribing witnesses.

HERMANN ARON.

Witnesses:
  HENRY HASPER,
  WOLDEMAR HAUPT.